US006142702A

United States Patent [19]

Simmons

[11] Patent Number: 6,142,702

[45] Date of Patent: Nov. 7, 2000

[54] PARKING SPACE SECURITY AND STATUS INDICATOR SYSTEM

[76] Inventor: Jason Simmons, 4832 73rd St., Lubbock, Tex. 79424

[21] Appl. No.: 09/199,248

[22] Filed: Nov. 25, 1998

[51] Int. Cl.[7] .............................. E01F 13/00; B60Q 1/48

[52] U.S. Cl. ........... 404/6; 194/DIG. 9 T; 194/DIG. 21; 340/932.2

[58] Field of Search ............................... 340/943, 932.2; 404/6, 9; 194/DIG. 21, DIG. 9 T

[56] References Cited

U.S. PATENT DOCUMENTS

| | | | |
|---|---|---|---|
| 3,248,691 | 4/1966 | Kirk . | |
| 3,270,847 | 9/1966 | Rudberg | 194/900 |
| 3,757,916 | 9/1973 | Selby | 194/1 R |
| 4,147,246 | 4/1979 | Stevens | 194/9 T |
| 4,752,152 | 6/1988 | Crisp et al. | 404/6 |
| 4,879,554 | 11/1989 | Diaz-Silveira | 340/932.2 |
| 4,998,843 | 3/1991 | Mothe | 404/6 |
| 5,146,710 | 9/1992 | Caldwell | 404/6 |
| 5,228,164 | 7/1993 | Nasatka | 404/6 |
| 5,485,700 | 1/1996 | Van Vranken | 52/40 |
| 5,841,369 | 11/1998 | Sutton et al. | 340/932.2 |

*Primary Examiner*—Thomas B. Will
*Assistant Examiner*—Raymond W. Addie

[57] ABSTRACT

A parking system is provided including a parking space and a vehicle sensor for detecting a presence of a vehicle within the parking space. Also included is a light indicator for indicating when the parking space is empty.

2 Claims, 2 Drawing Sheets

PARKING SPACE SECURITY AND STATUS INDICATOR SYSTEM

BACKGROUND OF THE INVENTION

1. Field of the Invention

The present invention relates to parking management systems and more particularly pertains to a new parking space security and status indicator system for preventing theft of a vehicle from a parking space and further indicating whether a parking space is occupied.

2. Description of the Prior Art

The use of parking management systems is known in the prior art. More specifically, parking management systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,101,235; U.S. Pat. No. 5,432,508; U.S. Pat. No. 3,838,760; U.S. Pat. No. Des. 279,460; U.S. Pat. No. 2,217,776; and U.S. Pat. No. 3,270,847.

In these respects, the parking space security and status indicator system according to the present invention substantially departs from the conventional concepts and designs of the prior art, and in so doing provides an apparatus primarily developed for the purpose of preventing theft of a vehicle from a parking space and further indicating whether a parking space is occupied.

SUMMARY OF THE INVENTION

In view of the foregoing disadvantages inherent in the known types of parking management systems now present in the prior art, the present invention provides a new parking space security and status indicator system construction wherein the same can be utilized for preventing theft of a vehicle from a parking space and further indicating whether a parking space is occupied.

The general purpose of the present invention, which will be described subsequently in greater detail, is to provide a new parking space security and status indicator system apparatus and method which has many of the advantages of the parking management systems mentioned heretofore and many novel features that result in a new parking space security and status indicator system which is not anticipated, rendered obvious, suggested, or even implied by any of the prior art parking management systems, either alone or in any combination thereof.

To attain this, the present invention generally comprises a mat with a planar rectangular configuration. The mat includes a planar top face, a planar bottom face, and a periphery formed therebetween defined by a pair of elongated side edges and a pair of short end edges. As shown in the Figures, a tire puncture assembly is provided including a thin elongated compartment with an open top formed in the mat between the side edges and along a first one of the end edges. A pivot rod is rotatably mounted within the compartment along a length thereof via a pair of brackets. Mounted along the pivot rod is a plurality of blades. Each of such blades is equipped with a convex rear edge, a concave front edge, and a sharp outboard end. FIGS. 1 & 2 show a drive assembly coupled to one end of the pivot rod adjacent the mat for rotating the pivot rod. In use, the blades are extended upwardly through the open top of the compartment only during actuation of the drive assembly. Next provided is a stand unit including a frusto conical base mounted on the mat at a second one of the end edges thereof. A stanchion is coupled to the base and extends upwardly therefrom. FIGS. 1 and 3 best show a light assembly which includes a pair of side bars coupled at ends thereof to define an elliptical frame. First ends of the frame of the light assembly are mounted atop the stanchion such that the side bars remain in a plane positioned in parallel with the end edges of the mat. To define an interior space, a pair of bulbous window plates are mounted between the side bars of the frame. The light assembly of the stand unit further includes a vertically spaced red and green light mounted within the interior space of the frame of the light assembly. Such lights are adapted for illuminating during the actuation thereof. For reasons that will soon become apparent, a horizontally oriented overhang bar is coupled atop the side bars of the frame of the light assembly. Ideally, the overhang bar extends over the mat in parallel relationship with the side edges of the mat. A terminal end of the overhang bar has a sensor adapted to generate a vehicle present signal only while a vehicle is present on the mat. Finally, a control assembly is provided including a module mounted on the mat adjacent to the second end edge of the mat. Such module remains adjacent the stand unit in use. The control assembly includes a display, a numeric keypad, and a coin collector, as shown in the various Figures. In use, the control assembly serves designate a proper predetermined numerical code sequence. Thereafter, the drive assembly is actuated until the reentry of the numerical code sequence via the keypad in combination with the deposit of a predetermined amount of compensation within the coin collector. Also during use, the control assembly is adapted to actuate the red light only upon the receipt of the vehicle present signal. Further the green light is actuated only upon the lack of receipt of the vehicle present signal, thereby indicating that the parking space is available.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new parking space security and status indicator system apparatus and method which has many of the advantages of the parking management systems mentioned heretofore and many novel features that result in a new parking space security and status indicator system which is not anticipated, rendered obvious, suggested, or even implied by any of the prior art parking management systems, either alone or in any combination thereof.

It is another object of the present invention to provide a new parking space security and status indicator system which may be easily and efficiently manufactured and marketed.

It is a further object of the present invention to provide a new parking space security and status indicator system which is of a durable and reliable construction.

An even further object of the present invention is to provide a new parking space security and status indicator system which is susceptible of a low cost of manufacture with regard to both materials and labor, and which accordingly is then susceptible of low prices of sale to the consuming public, thereby making such parking space security and status indicator system economically available to the buying public.

Still yet another object of the present invention is to provide a new parking space security and status indicator system which provides in the apparatuses and methods of the prior art some of the advantages thereof, while simultaneously overcoming some of the disadvantages normally associated therewith.

Still another object of the present invention is to provide a new parking space security and status indicator system for preventing theft of a vehicle from a parking space and further indicating whether a parking space is occupied.

Even still another object of the present invention is to provide a new parking space security and status indicator system that includes a parking space and a vehicle sensor for detecting a presence of a vehicle within the parking space. Also included is a light indicator for indicating when the parking space is empty.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
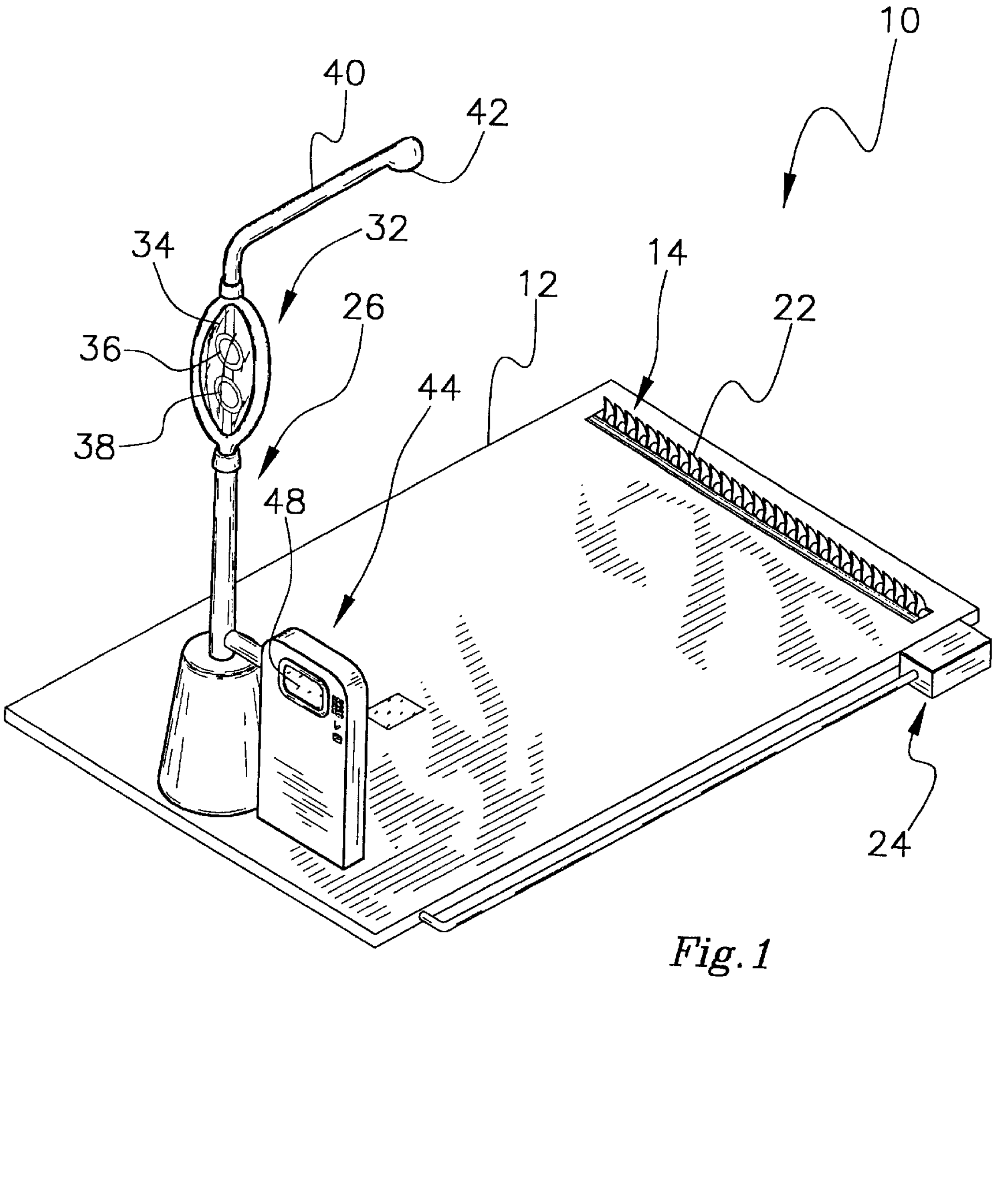
FIG. 1 is a perspective view of a new parking space security and status indicator system according to the present invention.

With reference now to the drawings, and in particular to FIGS. 1 through 6 thereof, a new parking space security and status indicator system embodying the principles and concepts of the present invention and generally designated by the reference numeral 10 will be described.

The present invention, designated as numeral 10, includes a mat 12 with a planar rectangular configuration. The mat includes a planar top face, a planar bottom face, and a periphery formed therebetween defined by a pair of elongated side edges and a pair of short end edges. It should be noted that the mat may be inset within a parking space or may constitute merely a portion of a parking lot.

As shown in the Figures, a tire puncture assembly 14 is provided including a thin elongated compartment 16 with an open top formed in the mat between the side edges and along a first one of the end edges. A pivot rod 18 is rotatably mounted within the compartment along a length thereof via a pair of brackets 20 which are equipped with bearings. Mounted along the pivot rod is a plurality of blades 22. Each of such blades is equipped with a convex rear edge, a concave front edge, and a sharp outboard end. As an option, the blades may be of the type which allow a vehicle to drive thereover in a first direction but not allow the vehicle to drive thereover in a second direction.

Figure 2:
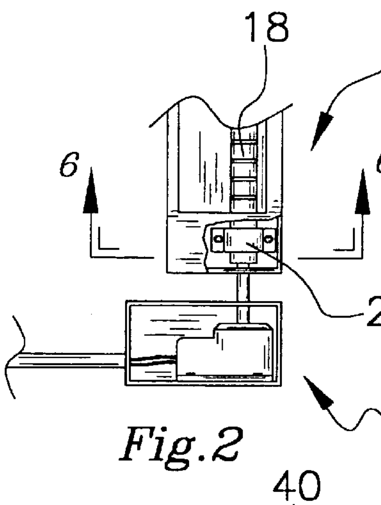
FIG. 2 is a sectional view of the drive assembly of the present invention.

FIGS. 1 & 2 show a drive assembly 24 coupled to one end of the pivot rod adjacent the mat for rotating the pivot rod. In use, the blades are extended upwardly through the open top of the compartment only during actuation of the drive assembly. As shown in FIG. 2, the drive assembly may take the form of a motor or the like.

Figure 3:
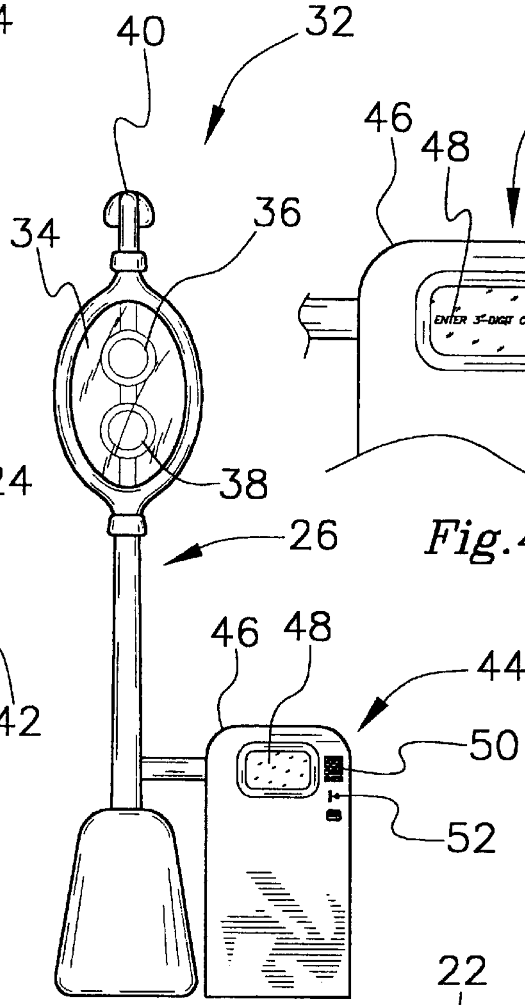
FIG. 3 is a side view of the stand unit of the present invention.
Figure 4:
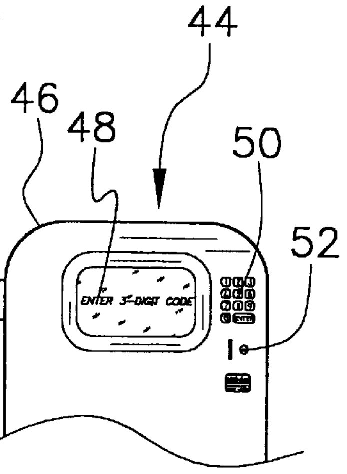
FIG. 4 is a detailed view of the display, keypad, and coin collector of the controller of the present invention.
Figure 5:
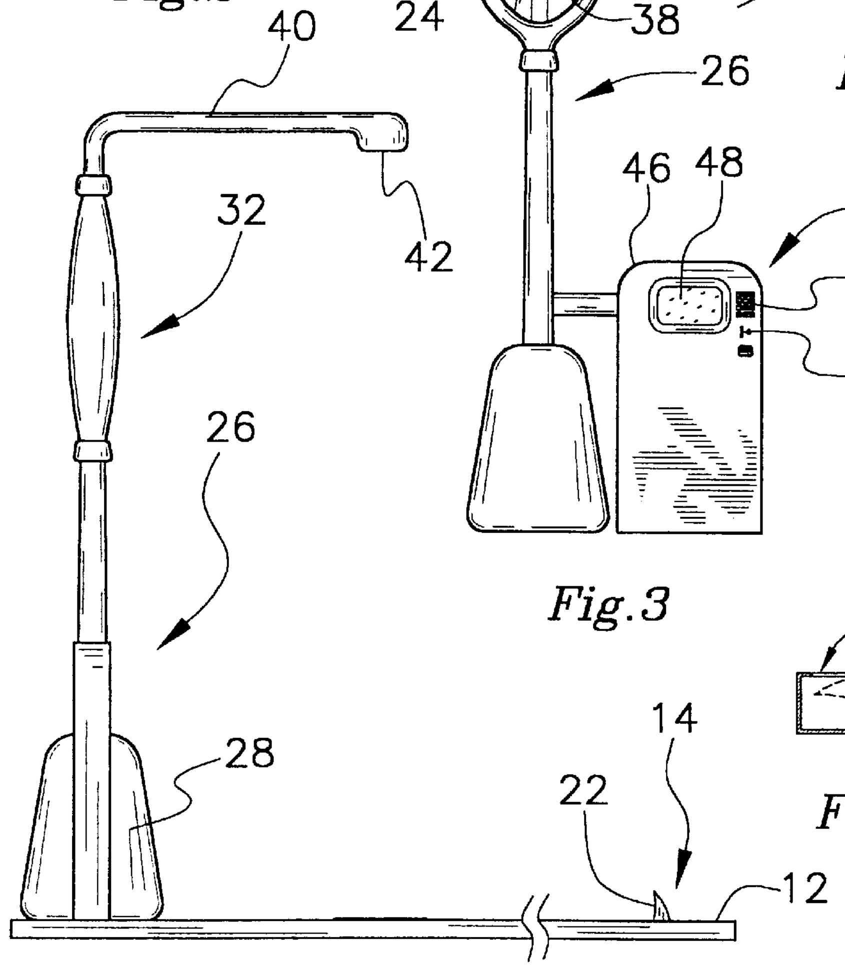
FIG. 5 is a side view of the present invention.
Figure 6:
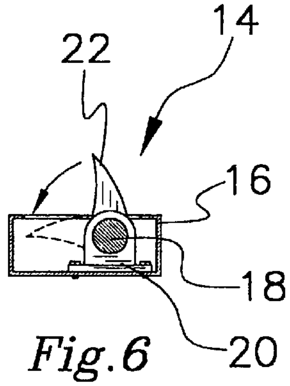
FIG. 6 is a side cross-sectional view of the present invention taken along line 6—6 shown in FIG. 2.

Next provided is an 8 foot stand unit 26 including a frusto conical base 28 mounted on the mat at a second one of the end edges thereof. A stanchion 30 is coupled to the base and extends upwardly therefrom. FIGS. 1 and 3 best show a light assembly 32 which includes a pair of side bars coupled at ends thereof to define an elliptical frame. First ends of the frame of the light assembly are mounted atop the stanchion such that the side bars remain in a plane positioned in parallel with the end edges of the mat. To define an interior space, a pair of bulbous window plates 34 are mounted between the side bars of the frame.

The light assembly of the stand unit further includes a vertically spaced red light 36 and green light 38 mounted within the interior space of the frame of the light assembly. Such lights are adapted for illuminating during the actuation thereof. For reasons that will soon become apparent, a horizontally oriented overhang bar 40 is coupled atop the side bars of the frame of the light assembly. Ideally, the overhang bar extends over the mat in parallel relationship with the side edges of the mat. A terminal end of the overhang bar has a sensor 42 adapted to generate a vehicle present signal only while a vehicle is present on the mat. In order to accomplish this, the sensor preferably emits an infrared beam or the like vertically downward toward a reflective panel on the mat with a Lexan plate thereon. The sensor may also be equipped with a photodiode or the like in order to create the signal when the beam is not reflected back or, in other words, the parking space is occupied. Ideally, the reflective panel is positioned toward a front of the mat in order to prevent oil from leaking thereon. As an option, a distance sensor or the like may be used thereby preventing the requirement of the reflective panel.

Finally, a control assembly 44 is provided including a module 46 mounted on the mat adjacent to the second end edge of the mat. Such module remains adjacent the stand unit in use. The control assembly includes a display 48, a numeric keypad 50, and a coin collector 52, as shown in the various Figures. The control assembly is preferably connected to the lights, sensor and drive assembly. Connection with the drive assembly is preferably accomplished via a tube shown in FIG. 1.

In use, the control assembly serves to designate a predetermined numerical code sequence. While this may be accomplished by the user typing in the code, the numerical code sequence is preferably randomly picked by the controller and dispensed by way of a printer(not shown) which is connected to the controller and positioned on the module. Ideally, a button must be pressed prior to the numerical code sequence being picked. Thereafter, the drive assembly is actuated until the reentry of the numerical code sequence via the keypad in combination with the deposit of a predetermined amount of compensation within the coin collector. Such predetermined amount of compensation is preferably a function of an amount of time from when the code is designated.

Also during use, the control assembly is adapted to actuate the red light only upon the receipt of the vehicle present signal. Further the green light is actuated only upon the lack of receipt of the vehicle present signal, thereby indicating that the parking space is available. As an option, upon the vehicle present signal being received and the code not be designated, the controller automatically begins calculating the time-based compensation. In such case, such compensation is only needed to deactuate the tire puncture mechanism since the code was not retrieved.

As such, a user may drive upon the empty mat after which the vehicle is prevented from being stolen by way of the blades. Once the rightful owner returns, the code must be re-entered and the compensation rendered in order to deactuate the blades.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A parking system for monitoring payment of parking fees and deterring theft of vehicles from parking spaces, the parking system comprising:

a parking space having a front end, a rear end and laterally spaced sides such that a vehicle passes through the rear end when entering or leaving the parking space;

a vehicle sensor for detecting a presence of a vehicle within the parking space;

a tire puncture mechanism positioned at the rear end of the parking space such that wheels of a vehicle must pass over the tire puncture mechanism when entering or exiting the parking space, the tire puncturing mechanism is adapted for selectively precluding a vehicle from being removed from the parking space;

a controller for actuating the tire puncture mechanism;

a verification unit connected to the controller and being adapted to accept identification from an owner of a vehicle;

a coin collector connected to the controller; and the controller being adapted to activate the tire puncture mechanism when the vehicle sensor detects the presence of a vehicle in the parking space and deactivating the tire puncture mechanism when the verification unit verifies that an owner of the vehicle correctly identifies itself to the verification unit in combination with a deposit of a predetermined amount of compensation within the coin collector; and a parking space status indicator for giving a positive status indication of the availability of the parking space, the parking space status indicator including a light indicator mounted atop a post adjacent the parking space, wherein the light indicator includes a red light for indicating that a vehicle is present within the parking space when illuminated, and a green light for indicating that the parking space is empty when illuminated.

2. A parking system as set forth in claim 1 wherein the light indicator is protected by a housing, the housing having a pair of side bars coupled at ends thereof to define an elliptical frame, a pair of bulbous window plates mounted between the side bars of the frame to define an interior space, wherein the light indicator is positioned within the interior space.

* * * * *